United States Patent
O'Keeffe et al.

(10) Patent No.: US 9,035,828 B2
(45) Date of Patent: May 19, 2015

(54) COMMUNICATION SYSTEM, APPARATUS AND METHODS FOR CALIBRATING AN ANTENNA ARRAY

(75) Inventors: Conor O'Keeffe, Cork (IE); Michael O'Brien, Cork (IE)

(73) Assignee: Socowave Technologies, Ltd., Dublin (IE)

( * ) Notice: Subject to any disclaimer, the term of this patent is extended or adjusted under 35 U.S.C. 154(b) by 752 days.

(21) Appl. No.: 13/201,566

(22) PCT Filed: Feb. 10, 2010

(86) PCT No.: PCT/EP2010/051649
§ 371 (c)(1),
(2), (4) Date: Oct. 13, 2011

(87) PCT Pub. No.: WO2010/092082
PCT Pub. Date: Aug. 19, 2010

(65) Prior Publication Data
US 2012/0027066 A1 Feb. 2, 2012

(30) Foreign Application Priority Data
Feb. 13, 2009 (GB) .................................... 0902410.0

(51) Int. Cl.
*H01Q 3/26* (2006.01)
*H04B 17/00* (2006.01)
(Continued)

(52) U.S. Cl.
CPC ................ *H01Q 3/267* (2013.01); *H04B 17/21* (2013.01); *H01Q 1/246* (2013.01); *H04B 7/10* (2013.01); *H04B 17/0085* (2013.01); *H04B 17/12* (2013.01); *H04B 17/20* (2013.01)

(58) Field of Classification Search
CPC ............ H01Q 3/26; H01Q 3/267; G01S 7/40; G01S 3/023
USPC .................................................. 342/368, 372
See application file for complete search history.

(56) References Cited

U.S. PATENT DOCUMENTS 5,253,188 A 10/1993 Lee et al.
6,157,343 A * 12/2000 Andersson et al. ........... 342/371
(Continued)

FOREIGN PATENT DOCUMENTS

WO WO 2005/053094 8/2005
WO WO 2008/000318 1/2008
WO WO 2008000318 A1 * 1/2008 ................ H01Q 3/26

OTHER PUBLICATIONS

Office Action from the Chinese Patent Office in a counterpart Chinese Application No. 201080016607.9 dated Jul. 25, 2013, including an English translation (22 pages).
(Continued)

*Primary Examiner* — Gregory C Issing
(74) *Attorney, Agent, or Firm* — Frank M. Scutch, III

(57) ABSTRACT

A method for calibrating (700) an antenna array comprises a plurality of antenna elements coupled to a plurality of respective receive paths in a wireless communication system. The method comprises, in receive mode, applying a test signal to an individual single receive path (715) of the plurality of receive paths; and feeding back the test signal via a switched coupler network. The method further comprises running a receive calibration measurement routine to determine at least one measurement value used to calibrate the individual signal receive path and waiting for at least one converged measurement value; and extracting (720) the converged measurement value for at least one individual receive path. The steps of applying, running, extracting for a next individual single receive path are repeated until the calibration routine has completed (725). The method further comprises selecting a converged measurement value of at least one individual receive path from a plurality of receive paths (730) to form a reference receiver calibration result (730); normalizing a plurality of at least one measurement values of the plurality of receive paths using the reference receiver calibration result (730); and applying a normalized value to at least one of the plurality of receive paths.

18 Claims, 8 Drawing Sheets

(51) Int. Cl.
*H01Q 1/24* (2006.01)
*H04B 7/10* (2006.01)

(56) References Cited

U.S. PATENT DOCUMENTS

| | | | |
|---|---|---|---|
| 6,339,399 B1 | 1/2002 | Andersson et al. | |
| 6,597,730 B1* | 7/2003 | Bader | 375/219 |
| 7,042,394 B2* | 5/2006 | Sayers | 342/432 |
| 7,205,936 B2* | 4/2007 | Park et al. | 342/368 |
| 2005/0272392 A1* | 12/2005 | Richardson | 455/272 |
| 2006/0044185 A1* | 3/2006 | Jin et al. | 342/368 |
| 2006/0202891 A1* | 9/2006 | Izumi et al. | 342/368 |
| 2012/0020392 A1* | 1/2012 | O'Keeffe et al. | 375/221 |

OTHER PUBLICATIONS

Notification of Second Office Action from State Intellectual Property Office of the People's Republic of China in copending Chinese Application No. 2010/80016607.9 dated Jun. 5, 2014, including an English Text Portion translation (8 Pages).

* cited by examiner

COMMUNICATION SYSTEM, APPARATUS AND METHODS FOR CALIBRATING AN ANTENNA ARRAY

FIELD OF THE INVENTION

The field of the invention relates to active antenna array arrangement for use in communication systems and in particular, but not exclusively, to calibration and control of active antenna arrays.

BACKGROUND OF THE INVENTION

Currently, 3rd generation (3G) cellular communication systems are being developed to further enhance the communication services provided to mobile phone users. The most widely adopted 3rd generation communication systems are based on Code Division Multiple Access (CDMA) technology. Carrier frequencies are used for both uplink transmissions, i.e. transmissions from a mobile wireless communication unit (often referred to as wireless subscriber communication unit or user equipment in $3^{rd}$ generation systems) to the communication infrastructure via a wireless serving base station (often referred to as a Node-B in $3^{rd}$ generation systems) and downlink transmissions, i.e. transmissions from the communication infrastructure to the mobile wireless communication unit via a wireless serving base station (e.g. Node-B). A further description of CDMA, and specifically of the Wideband CDMA (WCDMA) mode of Universal Mobile Telecommunication System (UMTS), can be found in 'WCDMA for UMTS', Harri Holma (editor), Antti Toskala (Editor), Wiley & Sons, 2001, ISBN 0471486876.

CDMA communication, as used in 3G mobile communications air interface technologies, is an 'interference limited' technology from a data throughput perspective. CDMA technology utilises orthogonal variable spreading factor (OVSF) codes combined with pseudo noise (Pn) codes to differentiate multiple UEs that are utilising the same spectrum at the same time for uplink access on the Uu radio interface. In order to maintain sufficient signal-to-interference ratio (SIR) protection for all UEs on accessing the Node-B, up-link (UL) power control (PC) is dynamically managed by the network infrastructure. SIR estimation is commonly derived from pilot tones in the uplink (UL) dedicated paging control channel (DPCCH). User equipment (UE) devices transmitting to a Node-B on the same spreading factor (SF) would be arranged such that their respective transmissions have substantially the same power when received at the receiving Node-B. Often, up to ninety six UEs are simultaneously supported in call mode for a specific Node-B.

Modern modulation schemes used in many cellular communication systems use high peak-to-average ratios. A peak-to-average ratio of 10.5 dB is not uncommon in many versions of $3^{rd}$ generation partnership project (3GPP) wireless communication systems, such as: EDGE, wideband code division multiple access (WCDMA), WiMAX and long term evolution (LTE). Therefore, the PA needs to be operating in a linear mode when using these modulation schemes, thereby driving down the PA efficiency to sub 10%. This implies that a 100 W PA consumes in excess of 1 kW DC power.

Major efforts have been underway in recent years to improve this poor power efficiency by utilising schemes such as adaptive predistortion. Predistortion schemes utilise feedback paths where the PA output is monitored and the resultant modulation signal and the distortion detection enables an 'anti-distortion' co-efficient to be applied to the (forward path) modulation signal, thereby compensating for (off-setting) the subsequent signal distortion created by the PA. In this manner, the use of predistortion schemes allows the PA to operate in a more non-linear mode of operation, thereby increasing the PAs overall efficiency. Thus, as a result of this efficiency drive, the selection and operation of the PA is closely coupled to the operation of the modulator components.

Conventional antenna arrays, comprising multiple antenna elements and used with existing Node-B equipment in most 3G installations, utilise a fixed +/−65° beam pattern. Outside of the main lobe of the antenna beam the signals are spatially filtered and significantly attenuated. Conventional network planning and passive antenna array solutions process all incoming signals with a common fixed beam pattern. Such receive processing, based on signals received within the geographic area identified by the antenna beam main lobe, referred to as the RF footprint, tends to dictate a corresponding common beam pattern for transmitter operation. Thus, an identical radio frequency (RF) footprint is used for both receive (Rx) and transmit (Tx) operation.

Rx beam-forming using antenna arrays depends on the ability to constructively add incident signals on each of the antenna elements in a way that coherently adds those from the desired direction. Thus, incident signals that are not from the desired direction will be incoherently added, and thus will not experience the same processing gain. The term 'coherency' implies that the signals will have substantially the same phase angle. In addition, thermal noise from multiple sources also exhibits incoherent properties, and thus when added the signals from multiple sources do not experience the same processing gain as a coherent desired signal.

Conversely in Tx active antenna arrays the signals are coherently combined within the intended beam pattern as electromagnetic (EM) signals in the 'air' so that they arrive coherently at the mobile station (MS) (e.g. UE) receiver.

In a Node-B antenna array arrangement, the received RF signal from a single UE cannot be discerned without demodulation of the composite signal. Individual receive beam-forming for a specific user is not feasible, since there is likely to be multiple received signals of comparable powers from different UEs simultaneously at the antenna array. Even if few UEs are utilising the Node-B, the likelihood is that the signals would be below the noise floor of the Node-B's receiver. The processing gain of a WCDMA receiver implies that the signal can be extracted from the noise floor. This, however, requires at least a partial demodulation process.

Most known beam-forming schemes consider beam-forming only in the radio frequency (RF) domain. Therefore, common baseband filter stages are used. The inventors of the present invention have recognised and appreciated that variation in the common baseband filter stages may dominate overall latency in the system, which have not been considered or corrected for in the known prior art. Furthermore, digital-to-analogue converters and analogue-to-digital converters are required to sample at increased frequency rates, driven by new air interface protocols. Thus, maintaining clock phase synchronization to such devices across the array of elements is becoming increasingly difficult. Furthermore, samples processed in the digital domain may be subject to latencies in excess of an integer cycle compounding the need to resolve latency mismatch.

For example, if a slow rate of change of modulation with respect to the RF is considered, then any latency in paths that correspond to multiple wavelengths of the RF signal have little effect. One example of this would be the case of the Global System for Mobile communications (GSM) standard, where the rate of change of phase per RF cycle is so low that it is not measured. In the GSM standard, the symbol rate is approximately 270 kS/s. In contrast, the more recent mobile communication technologies employ air-interface protocols that have symbol rates in wider bandwidth RF signals, where the rate of change of phase/amplitude per RF cycle is significant. Such a rate of change of phase/amplitude per RF cycle level has been found to cause distortion to the resultant beam-forming of signals.

WO 2008/000318(A1) highlights a problem of reference calibration signal generation and feedback path effects on phase/amplitude measurements. In order to attempt to solve this problem, WO 2008/000318(A1) proposes a coupler scheme that necessitates that multiple receiver or transmitter chains need to be disabled in order to perform the calibrations. This requirement is an artefact of the common coupler structure to multiple antenna paths. However, WO 2008/000318(A1) fails to describe a mechanism to perform calibration. It is noted that the proposed coupler scheme would also substantially degrade network performance when performed during live transmission of a network, as all but one transmitter at a time can be measured.

U.S. Pat. No. 6,339,399 B1 proposes a mechanism that uses distinct beam-forming component blocks to that for receive calibration resultant correction. In the mechanism proposed in U.S. Pat. No. 6,339,399 B1, only amplitude and phase correction on the respective receive paths is taken into consideration, due to the sole use of a complex multiplier as the corrective mechanism. In the mechanism proposed in U.S. Pat. No. 6,339,399 B1, only one coupling path per antenna element feed is employed. This, as highlighted in U.S. Pat. No. 6,339,399 B1, can cause an effect whereby feedback or calibration tone path error can dominate over receive path error.

Consequently, current techniques are suboptimal. Hence, an improved mechanism to address the problem of supporting antenna array technology in a wireless communication network would be advantageous.

SUMMARY OF THE INVENTION

Accordingly, the invention seeks to mitigate, alleviate or eliminate one or more of the above mentioned disadvantages singly or in any combination.

According to a first aspect of the invention, there is provided, a method for calibrating an antenna array comprises a plurality of antenna elements coupled to a plurality of respective receive paths in a wireless communication system. The method comprises, in receive mode, applying a test signal to an individual single receive path of the plurality of receive paths; and feeding back the test signal via a switched coupler network. The method further comprises running a receive calibration measurement routine to determine at least one measurement value used to calibrate the individual signal receive path and waiting for at least one converged measurement value; and extracting the converged measurement value for at least one individual receive path. The steps of applying, running, extracting for a next individual single receive path are repeated until the calibration routine has completed. The method further comprises selecting a converged measurement value of at least one individual receive path from a plurality of receive paths to form a reference receiver calibration result; normalizing a plurality of at least one measurement values of the plurality of receive paths using the reference receiver calibration result; and applying a normalized value to at least one of the plurality of receive paths.

The invention may allow improved use of active antenna array based systems, since it allows for calibration whilst the communications system is processing live network traffic. Furthermore, systemic calibration path induced errors can be eliminated by the calibration process.

According to an optional feature of the invention, applying a test signal may comprise setting a test signal amplitude level.

According to an optional feature of the invention, the setting an optimal test signal amplitude level may comprise setting a test signal amplitude level by factoring an ambient radio frequency environment effect on an associated antenna element of the single individual receive path.

According to an optional feature of the invention, the method may further comprise identifying those single individual receive paths whose converged at least one measurement value is determined as being below a signal threshold level.

According to an optional feature of the invention, the method may further comprise identifying the single individual receive path as a failed receive path upon determination that the converged at least one measurement value is below a signal threshold level.

According to an optional feature of the invention, the method may further comprise eliminating from the receive calibration process the single individual receive path identified as failed.

According to a second aspect of the invention, there is provided a method for calibrating an antenna array that comprises a plurality of antenna elements coupled to a plurality of respective transmit paths in a wireless communication system. The method comprises, in transmit mode, routing live transmit network signals through at least one transmit path; and feeding back a portion of the live transmit signals pertaining to a selected path under calibration measurement via a switched coupler network. The method further comprises running a transmit calibration measurement routine to determine at least one measurement value used to calibrate the individual single transmit path and waiting for at least one converged measurement value; and extracting the converged measurement value of at least one individual single transmit path. The method further comprises repeating steps of applying, running, extracting for a next individual single transmit path until the calibration routine has completed. The method further comprises selecting a converged measurement value of at least one individual single transmit path from a plurality of transmit paths to form a reference transmitter calibration measurement result; normalizing a plurality of at least one measurement values of a plurality of transmit paths using the reference transmitter calibration result; and applying a normalized measurement value to at least one of the plurality of transmit paths.

According to an optional feature of the invention, the method may further comprise identifying for at least one of the single individual transmit paths whether: the converged at least one measurement value is below a threshold value; or the calibration did not converge.

According to an optional feature of the invention, the method may further comprise identifying the single individual transmit path as a failed transmit path upon identifying that: the converged at least one measurement value is determined as being below the threshold value, or the calibration did not converge.

According to an optional feature of the invention, the method may further comprise setting optimal calibration feedback line-up settings to factor a power level of the single individual transmit path.

According to an optional feature of the invention, wherein the at least one measurement value of the plurality of receive paths or the plurality of transmit paths may be a latency value. The method may further comprise determining a longest latency value for those receive paths or transmit paths that have been identified as one or more of the following: a receive converged at least one measurement value is not below the signal threshold; a transmit converged at least one measurement value is determined as not being below the threshold value; a transmit calibration that did converge.

According to an optional feature of the invention, the method may further comprise normalising each latency value for each of the single individual receive or transmit signals or each of the single individual receive or transmit signals to the longest latency value.

According to an optional feature of the invention, the method may further comprise scaling, for example complex scaling, the normalised at least one measurement value to at least one composite beam weighting coefficient for each receive path or transmit path of the plurality of receive paths or transmit paths; and applying the at least one composite beam weighting coefficient to at least one receive path or at least one transmit path.

According to an optional feature of the invention, the method may further comprise initialising calibration hardware.

According to an optional feature of the invention, the method may further comprise adjusting at least one measurement value of: latency, phase or amplitude measurement to incorporate any latency phase or amplitude adjustment that exists in a plurality of receive paths or transmit paths, for example where latency phase or amplitude adjustment that exists in a plurality of receive paths or transmit paths may be determined from a previous calibration iteration.

According to an optional feature of the invention, the method may further comprise setting a soft fail flag for the antenna element associated with the failed receive or transmit path following elimination.

According to an optional feature of the invention, the at least one measurement value may be determined by an adaptive filter measurement value.

According to an optional feature of the invention, the method may further comprise using a common antenna array element and corresponding common switched coupler paths in receive mode and transmit mode.

According to a third aspect of the invention, there is provided a network element for calibrating an antenna array comprising a plurality of antenna elements coupled to a plurality of respective receive paths in a wireless communication system. The network element comprises, in receive mode, a plurality of independent receiver circuits coupled to respective antenna elements of the antenna array; and test signal generation logic arranged to apply a test signal to an individual single receive path of the plurality of receive paths. The network element further comprises a feedback path for feeding back the test signal via a switched coupler network; and processing logic for running a receive calibration measurement routine to determine at least one measurement value used to determine calibration correction of the individual signal receive path and waiting for at least one converged measurement value. The network element further comprises extracting logic arranged to extract the converged at least one measurement value for the at least one individual receive path; wherein the test signal generation logic, processing logic and extracting logic repeat steps of applying, running, extracting for a next individual single receive path until the calibration measurement routine has completed. The network element further comprises logic for selecting a converged measurement value of at least one individual receive path from a plurality of receive paths to form a reference receiver calibration result; logic for normalizing a plurality of at least one measurement values of the plurality of receive paths using the reference receiver calibration result; and logic for applying the at least one composite beam weighting coefficient to respective receive paths.

According to a fourth aspect of the invention, there is provided a network element for calibrating an antenna array comprising a plurality of antenna elements coupled to a plurality of respective transmit paths in a wireless communication system. The network element comprises, in transmit mode, a plurality of independent transmit circuits coupled to respective antenna elements of the antenna array; and logic for routing live transmit signals through least one transmit path. The network element further comprises a switched coupler network arranged to feed back a portion of the live transmit signals pertaining to a selected path under calibration measurement via a switched coupler network; and processing logic for running a transmit calibration routine to determine at least one measurement value used to calibrate the individual single transmit path and waiting for at least one converged measurement value. The network element further comprises logic for extracting the converged at least one measurement value of at least one individual single transmit path; wherein the processing logic and logic for extracting are arranged to repeat steps of applying, running, extracting for a next individual single transmit path until the calibration routine has completed. The network element further comprises logic for selecting a converged measurement value of at least one individual single transmit path from a plurality of transmit paths to form a reference transmitter calibration measurement result; logic for normalizing a plurality of at least one measurement values of a plurality of transmit paths using the reference transmitter calibration result; and logic for applying the normalized measurement value to at least one of the plurality of transmit paths.

According to a fifth aspect of the invention, there is provided a computer program product comprising program code for calibrating an antenna array comprising a plurality of antenna elements coupled to a plurality of respective receive paths in a wireless communication system. The computer program product comprising program code for, in receive mode, calibrating an antenna array comprises a plurality of antenna elements coupled to a plurality of respective receive paths in a wireless communication system. The program code is operable for applying a test signal to an individual single receive path of the plurality of receive paths; and feeding back the test signal via a switched coupler network. The program code is operable for running a receive calibration measurement routine to determine at least one measurement value used to calibrate the individual signal receive path and waiting for at least one converged measurement value; and extracting the converged measurement value for at least one individual receive path. The steps of applying, running, extracting for a next individual single receive path are repeated until the calibration routine has completed. The program code is operable for selecting a converged measurement value of at least one individual receive path from a plurality of receive paths to form a reference receiver calibration result; normalizing a plurality of at least one measurement values of the plurality of receive paths using the reference receiver calibration result; and applying a normalized value to at least one of the plurality of receive paths.

According to a sixth aspect of the invention, there is provided a computer program product comprising program code for calibrating an antenna array comprising a plurality of antenna elements coupled to a plurality of respective transmit paths in a wireless communication system. The computer program product comprising program code for, in transmit mode, for calibrating an antenna array comprising a plurality of antenna elements coupled to a plurality of respective transmit paths in a wireless communication system. The program code is operable for routing live transmit network signals through at least one transmit path; and feeding back a portion of the live transmit signals pertaining to a selected path under calibration measurement via a switched coupler network. The program code is operable for running a transmit calibration measurement routine to determine at least one measurement value used to calibrate the individual single transmit path and waiting for at least one converged measurement value; and extracting the converged measurement value of at least one individual single transmit path. The program code is operable for repeating steps of applying, running, extracting for a next individual single transmit path until the calibration routine has completed. The program code is operable for selecting a converged measurement value of at least one individual single transmit path from a plurality of transmit paths to form a reference transmitter calibration measurement result; normalizing a plurality of at least one measurement values of a plurality of transmit paths using the reference transmitter calibration result; and applying a normalized measurement value to at least one of the plurality of transmit paths.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

In the field of radio-array active antenna technology, receive signals are additively combined coherently from the different receiver (Rx) elements. This receive combining operation may be implemented in the digital domain. For optimal coherency to exist on the separate signals at the combining stage, the latency, phase response and gain response of the respective receive paths should be equalised. Different receivers in an array may exhibit variations in these characteristics due to, say, component manufacturing tolerances, clock skew, temperature and power supply variations, etc. For example, in practical systems, there will be different instantiations of voltage regulators, and therefore different devices may exhibit process-induced offsets and temperature-dependent coefficients. Similarly, the clock distribution to multiple transceivers undergoes variations in the clock path, thereby causing an offset in relative phase to each transceiver. It is also known that temperature profiles within the antenna array housing may be significant.

Furthermore, each of the transceivers will not have the same proximity to heat generating components, such as the digital signal processing chain. Likewise certain transceivers will be at a periphery of the array, and therefore experience more variation due to the ambient environment. In addition, some transceivers will have different transmit power profiles, according to the beam-form coefficients, and as a result exhibit different thermal generation profiles.

Embodiments of the invention are described with reference to smart (or active) antenna technology used in a wireless communication system. Smart (or active) antenna technology is a radio technology where the antenna system comprises dedicated signal processing logic per antenna array element. Alternative embodiments may be employed in co-located antenna and signal processing units. Smart (active) antenna technologies fall into three broad families, namely: (i) multi-antenna systems (MAS); (ii) radiohead implementations with or without multiple in-multiple out (MIMO) radio ports; and (iii) active antenna arrays.

The following description focuses on embodiments of the invention that are applicable to active antenna arrays employed in Universal Mobile Telecommunication System (UMTS) cellular communication systems and in particular to a UMTS Terrestrial Radio Access Network (UTRAN) operating in a $3^{rd}$ generation partnership project (3GPP) system. However, it will be appreciated that the invention is not limited to this particular cellular communication system, but may be applied to any wireless communication system, including satellite communication systems, employing active antenna arrays where the antenna may be integrated with antenna beam-forming conversion apparatus or circuits.

Figure 1:
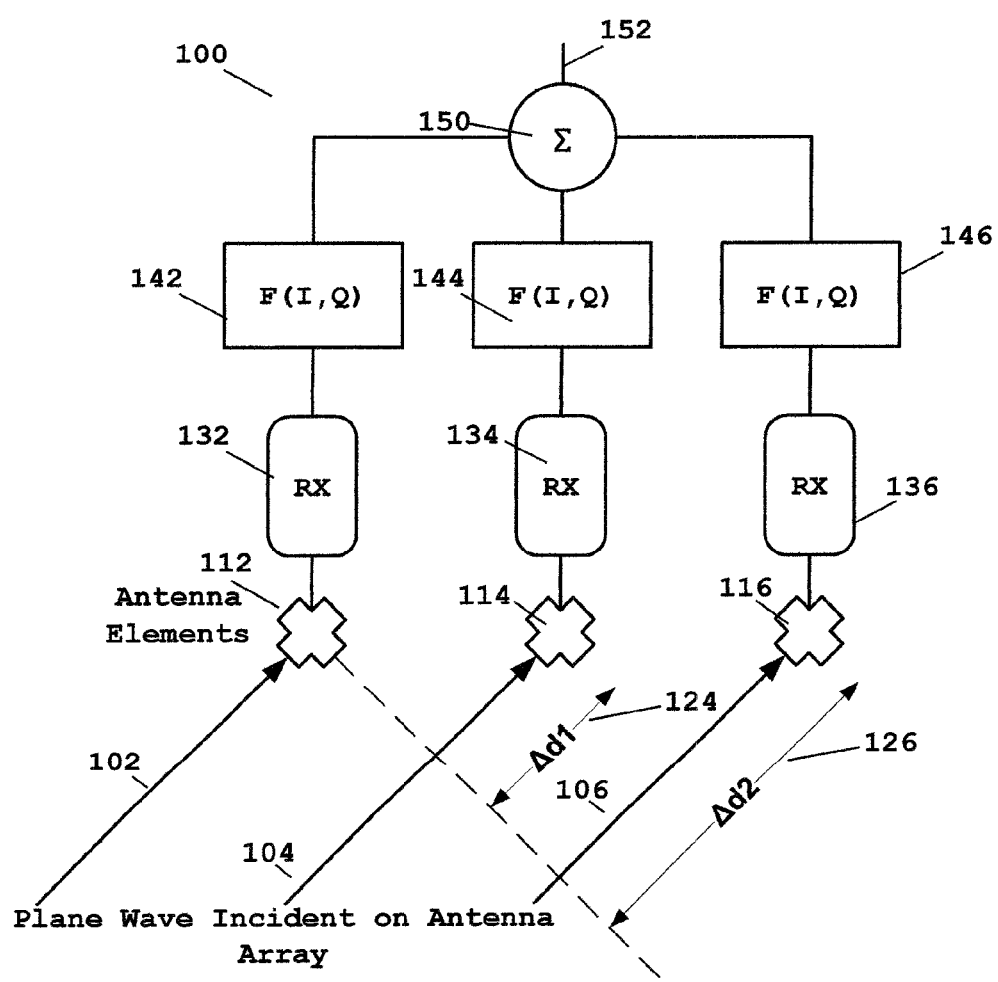
FIG. 1 illustrates an arrangement of a plane wave incident on antenna array in accordance with some embodiments of the invention.

FIG. 1 illustrates a 2-dimensional representation 100 of a plane wave 102, 104, 106 that is incident on an antenna array comprising a series of antenna elements 112, 114, 116. Due to the angle of arrival, of the incident plane wave, there may be a difference $\Delta d1$ 124 and $\Delta d2$ 126 in the distance for the plane wave to travel to the respective array elements 112, 114, 116. This distance will translate as a time difference, as described by the relationship $$\Delta t = \Delta d / C \qquad \text{[Eqn. 1]}$$

where: C is approximately $3.10^8$ m/sec.

For a specific carrier frequency this will translate as a phase difference ($\Delta\phi$) between incident signals.

$$\Delta\phi(\text{degrees}) = 360(\Delta d / \lambda) \qquad \text{[Eqn. 2]}$$

where: $\lambda$ is the wavelength of the incident carrier.

For beamforming the phase error on any single receive path 132, 134, 136 needs to be resolved to less than 10° for commercially viable beam steering systems. At 2 GHz this phase error translates to better than 50 ps matching on respective RX paths.

The f(I,Q) processing logic 142, 144, 146 in FIG. 1 are denoted to describe the phase, latency and amplitude transformation applied to the down-converted signals, so as to correct for any matching impairments between respective receiver paths. The f(I,Q) processing logic 142, 144, 146 also apply the beam-forming weights, so that signals confined to a desired beam pattern coverage area have substantially improved processing gain over that from outside the desired pattern area. Many of the gain, phase or latency errors associated with the receiver may change as a function of operating frequency, power supply fluctuations or environmental changes, such as temperature or humidity. The outputs from the respective f(I,Q) processing logic 142, 144, 146 are then combined in summer 150 to produce a composite signal 152.

It is noted that it would be particularly beneficial to support a calibration scheme that is able to operate during 'live' network reception.

The apparatus proposed in embodiments of the invention uses common signal processing steps in the received signal path in order to provide composite beam steering and calibration result corrective coefficients.

Figure 2:
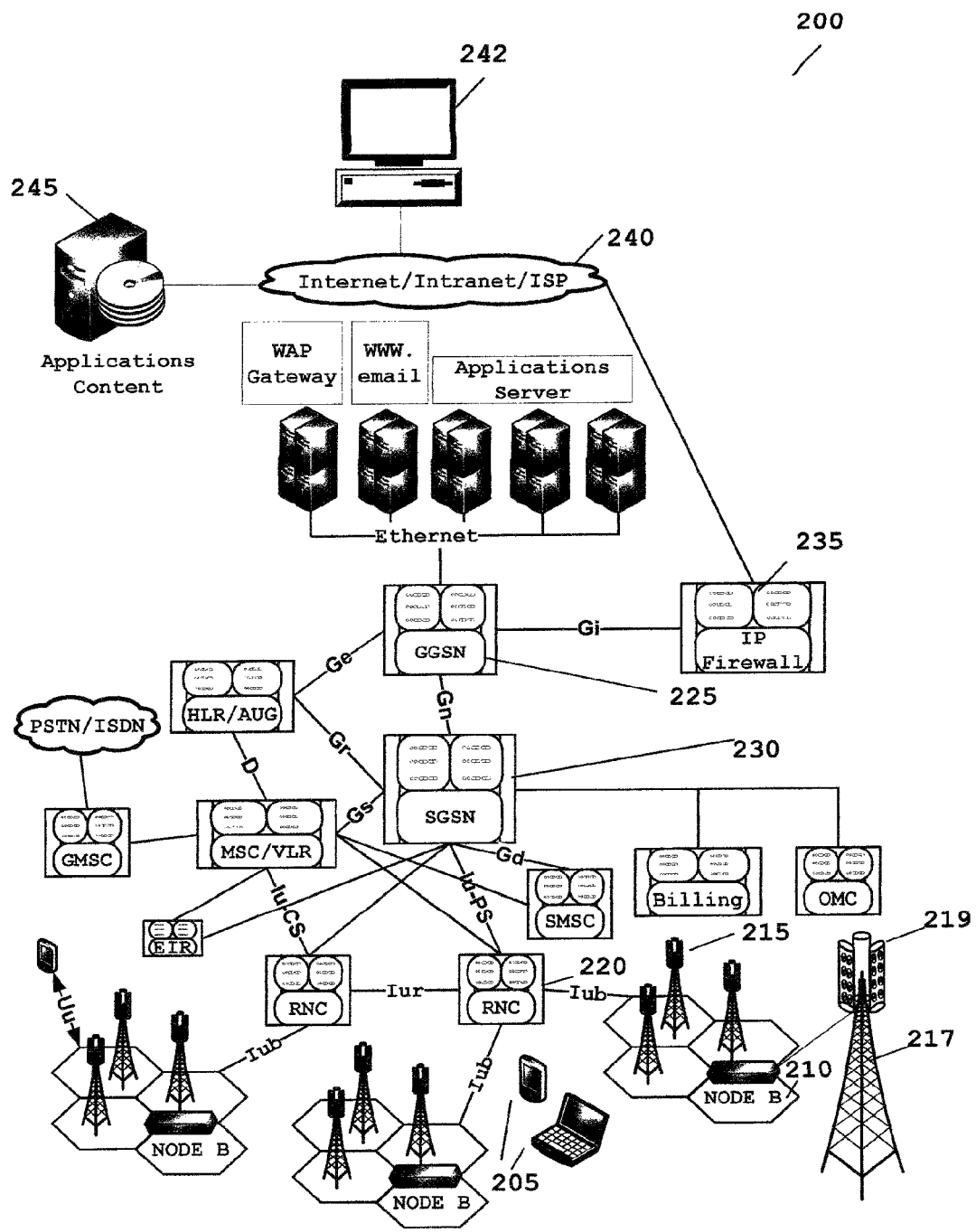
FIG. 2 illustrates an example of a 3GPP cellular communication system adapted in accordance with some embodiments of the invention.

Referring now to FIG. 2, a cellular-based communication system 200 is shown in outline, in accordance with one embodiment of the invention. In this embodiment, the cellular-based communication system 200 is compliant with, and contains network elements capable of operating over, an universal mobile telecommunication system (UMTS) air-interface.

A plurality of wireless subscriber communication units/terminals (or user equipment (UE) in UMTS nomenclature) 205 communicate over radio links with a plurality of base transceiver stations, referred to under UMTS terminology as Node-Bs, 215 supporting communication coverage over a particular communication cell 210. The system 200 comprises many other UEs and Node-Bs, which for clarity purposes are not shown.

The wireless communication system, sometimes referred to as a Network Operator's Network Domain, is connected to an external network 240, for example the Internet. The Network Operator's Network Domain includes:

(i) A core network, namely at least one Gateway General Packet Radio System (GPRS) Support Node (GGSN) 225 and at least one Serving GPRS Support Nodes (SGSN) 230; and (ii) An access network, comprising a UMTS Radio network controller (RNC) 220; and at least one UMTS Node-B 215, where each RNC 220 may control one or more Node-Bs 215.

The GGSN 225 or SGSN 230 is responsible for UMTS interfacing with a Public network, for example a Public Switched Data Network (PSDN) (such as the Internet) 240 or a Public Switched Telephone Network (PSTN). The SGSN 230 performs a routing and tunneling function for traffic, whilst a GGSN 225 links to external packet networks. Each SGSN 230 provides a gateway to the external network 240. The Operations and Management Centre (OMC) is operably connected to RNCs 220 and Node-Bs 215. The OMC comprises processing functions and logic functionality in order to administer and manage sections of the cellular communication system 200, as is understood by those skilled in the art.

The Node-Bs 215 are connected to external networks, through Radio Network Controller (RNC) stations, including RNC 220 and mobile switching centres (MSCs), such as SGSN 230. A cellular communication system will typically have a large number of such infrastructure elements where, for clarity purposes, only a limited number are shown in FIG. 2.

Each Node-B 215 contains one or more transceiver units and communicates with the rest of the cell-based system infrastructure via an $I_{ub}$ interface, as defined in the UMTS specification. Each Node-B 215 is operably coupled to an antenna mast 217 for transmitting and receiving signals to/from remote UEs, where each antenna mast 217 comprises an antenna array 219 adapted in accordance with embodiments of the invention.

In accordance with embodiments of the invention, active array technology is employed in the cellular communication system 200.

In accordance with example embodiments of the invention, a common active beam-former and correction scheme is employed. In known antenna array systems, such as U.S. Pat. No. 6,339,399, the beam-former operation and calibration correction scheme have necessarily been treated in isolation. Calibration corrections have been dependent on RF system component variation. In U.S. Pat. No. 6,339,399, software routines may be used to update beam-form coefficients directly to the beam-former and do not consider coefficients pertaining to calibration correction.

In contrast to the known art, embodiments of the invention address the beam-form coefficients and calibration correction coefficients for the antenna array. For receive calibration of the antenna array, individual receiver chains are measured over a specific duration and at a separate instance in time.

Figure 7:
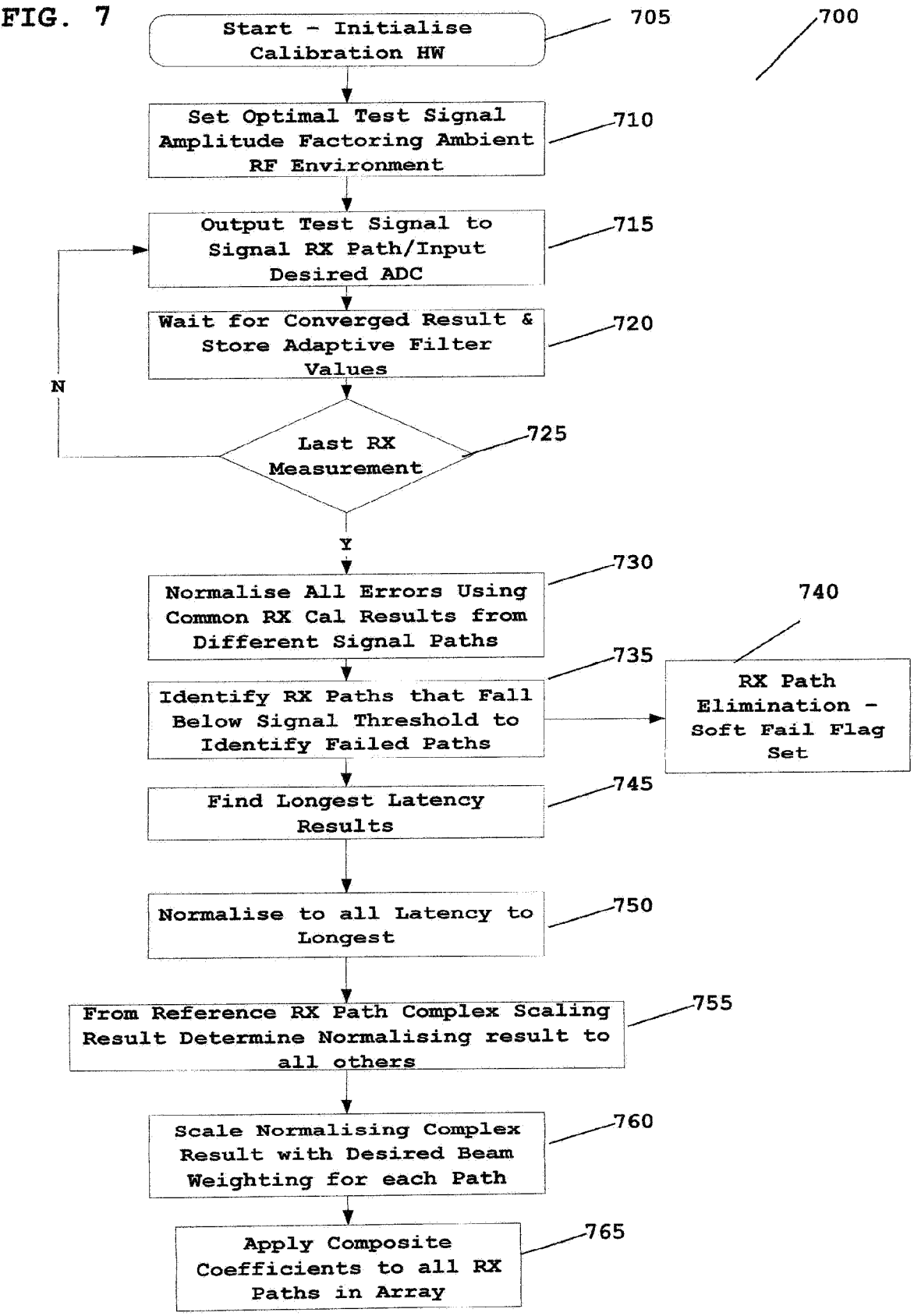
FIG. 7 illustrates a flowchart example of a method for calibrating receive beam-forming of an antenna array in a wireless communication system, adapted in accordance with embodiments of the invention.
Figure 8:
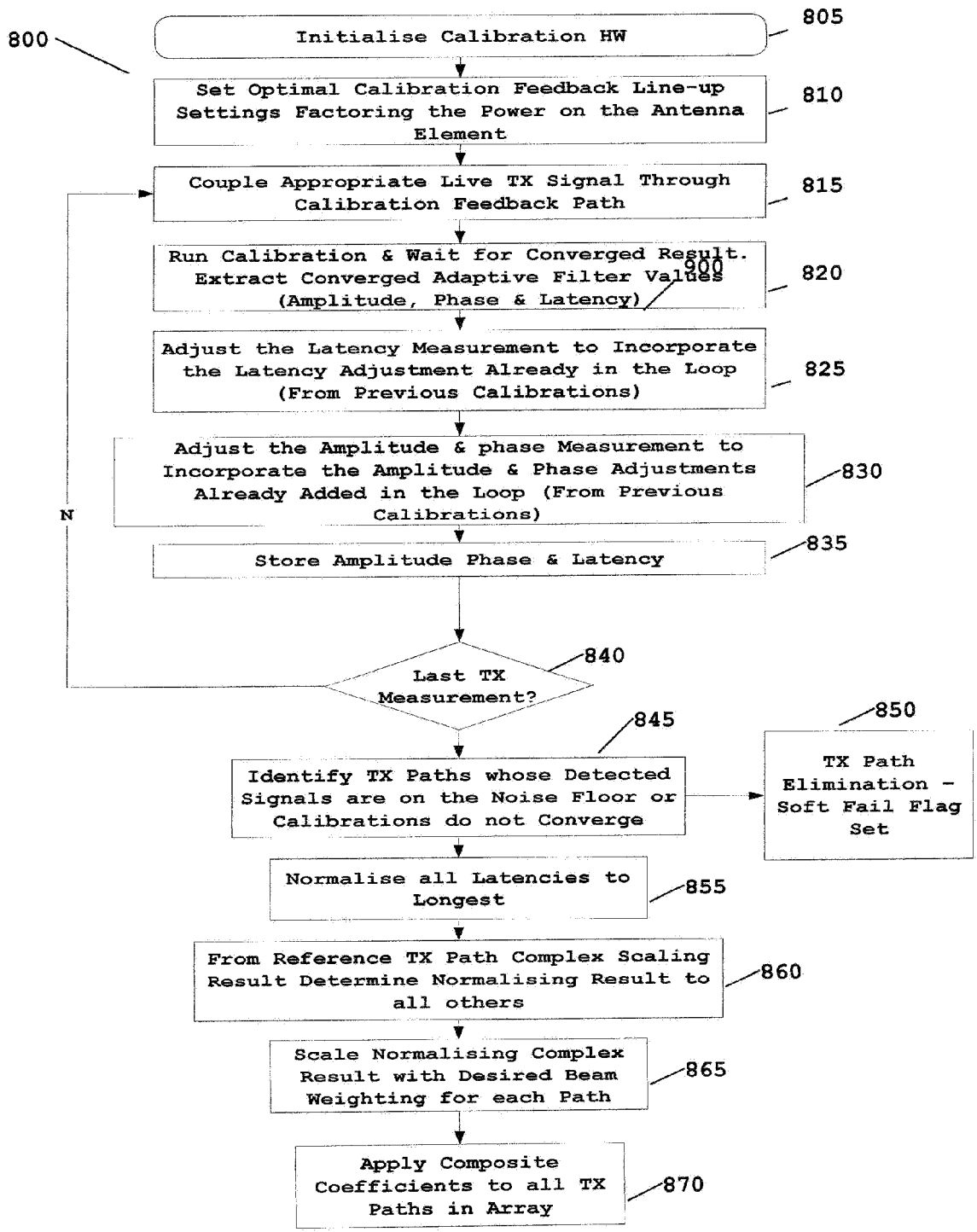
FIG. 8 illustrates a flowchart example of a method for calibrating transmit beam-forming of an antenna array in a wireless communication system, adapted in accordance with embodiments of the invention.

In one embodiment of the invention, a switched coupler network is used for receive and transmit antenna array calibration, utilising separate receive and transmit calibration routines, as described with respect to FIG. 7 and FIG. 8. For example, receive calibration is performed by measuring a transfer function of individual receive paths using one or more matched couplers that use different calibrating signal paths. Calculations are performed on the differences of transfer function measurement, and used to normalise the respective receive path transfer function, thereby negating effects of the signal path. Thus, measurement path errors of latency, phase and amplitude are calculated and compensated for. Furthermore, where calibrating signal paths are shared with other receiver measurements, the normalisation of the first measurement signal can further be applied to each receiver in the array, thus substantially minimising the effect of the calibration path error.

In one embodiment of the invention, the beam-form coefficients as set by baseband controlling software are first stored and then modified by calibration controller logic in order to generate a composite beam-form and error correction signal.

In one embodiment of the invention, an algorithm is described for sequencing through an antenna array and performing measurements of latency, phase and amplitude on the respective receive and transmit paths.

In one embodiment of the invention, an algorithm is described for a detection scheme to determine whether an antenna element within an antenna array fails.

In one embodiment of the invention, an algorithm is described for a method for determining composite weighting on respective receive paths for beam-forming and calibration corrective factor combined.

Figure 3:
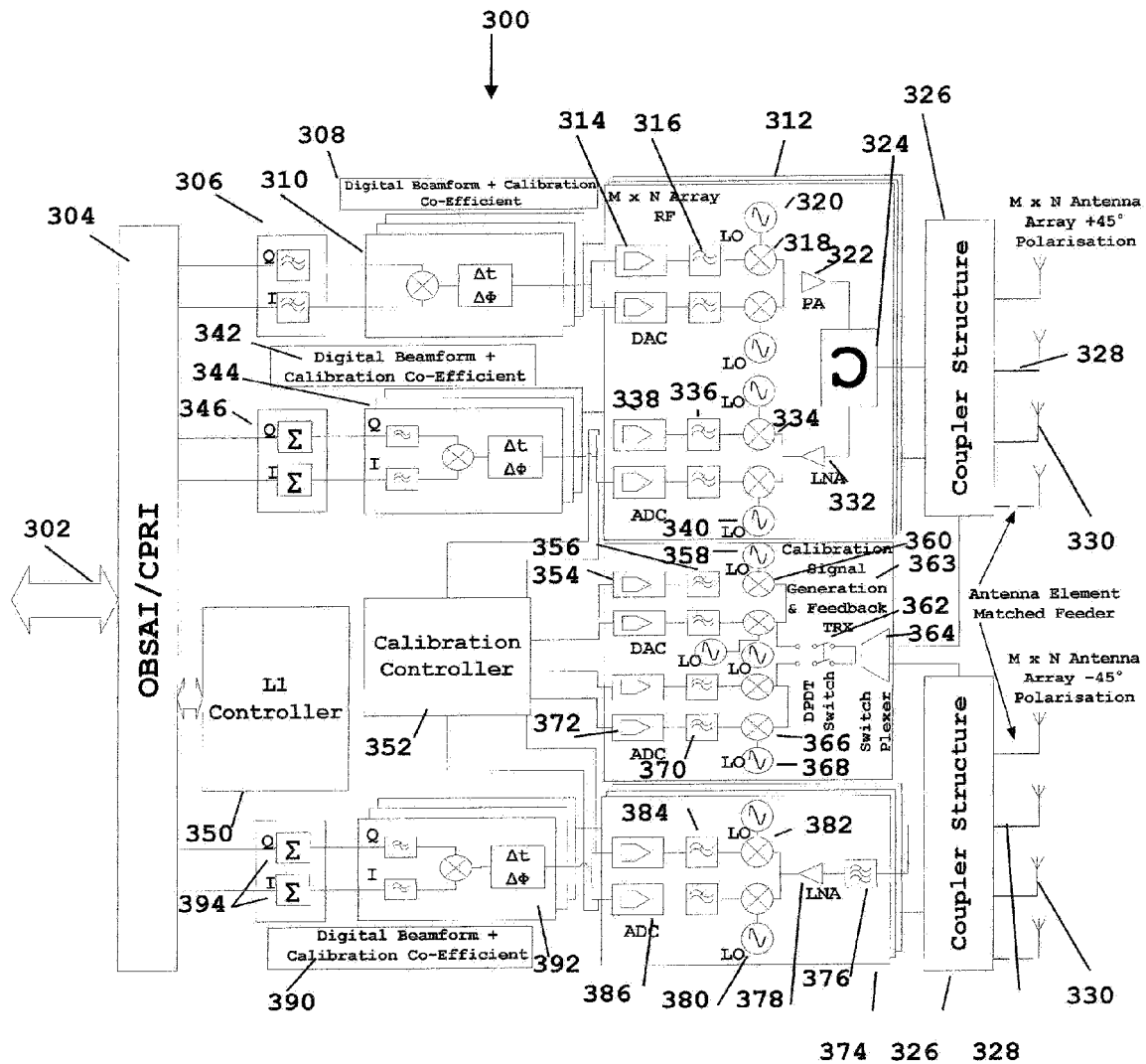
FIG. 3 illustrates an example of a network element arranged to perform beam-forming at an antenna mast in accordance with embodiments of the invention.

Referring now to FIG. 3, an example of a network element 300 arranged to perform beam-forming at an antenna mast is illustrated in accordance with embodiments of the invention. In this embodiment the calibration system is employed to correct both +45° and −45° polarised receive and transmit antenna array paths. One embodiment of the invention illustrates an OBSAI RP3 01 or CPRI interface 304, which is used for interfacing to 302 the baseband processing unit of a cellular base station, such as a 3GPP Node B. The Node B baseband performs demodulation and modulation encoding. The node B also interfaces with RNC to supply back haul communication to the rest of the network and wider communication infrastructure. Embodiments of the invention propose a network element 300, located adjacent an antenna array 330 with an intermediary digital active adaptive antenna array system that includes active control from, say, a modem.

Embodiments of the invention propose modem control of beam-forming and calibration of antenna arrays 330 substantially at the top of an antenna mast. In this manner, the modem control logic utilises RF down-conversion and analogue-to-digital conversion of signals sent to circuitry located substantially at the antenna mast top from the Node-B in a transmit mode of operation, or from an antenna array to be routed to the Node-B in a receive mode of operation. The modem control logic, in one embodiment of the invention, then performs digital signal processing to effect beam-forming and/or calibration of antenna arrays in a digital domain. Thereafter, the modem control logic configures the reverse operation of the beam formed and calibrated signal using digital-to-analogue conversion and RF up-conversion of signals, for forwarding to the antenna array in a transmit mode of operation or to the Node B in a receive mode of operation.

The embodiment illustrated in FIG. 3 relates to a transceiver array and associated conversion allowing Node-B processing. The embodiment illustrated in FIG. 3 also details a diagram of diversity reception. Modern air-interface protocols exploit antenna diversity to improve the air interface communication link. Conventional Antenna arrays contain an array of radiative antenna elements of +45° and −45° polarisation. Prior to the demodulation process these signals are processed independently. Since these are diverse paths, coherency is unlikely to exist. Therefore, the signals are not combined in the RF domain. Generally, it is sufficient to transmit in one polarisation type only. Hence, transceiver circuits 312 are connected to antenna elements of one polarisation type only. Conversely, receive diversity paths 374 are processed independently.

Embodiments of the invention utilise a plurality of parallel transceiver paths, equivalent to the number of antenna arrays used, plus one dedicated common calibration transceiver. A common signal source is used for receive calibration and a common feedback path is used for transmit calibration. In one embodiment, cross-polarised antenna arrays may be used. In this embodiment, a separate diversity receive path is required for each antenna element for both diversity and primary receivers.

An '8'×'2' antenna element array consists of sixteen antenna elements at +45 degree polarisation and sixteen antenna elements at −45 degree polarisation. Therefore, thirty-three receivers are required.

The antenna mast located network element 300, e.g. a modem, comprises a plurality of parallel transceiver circuits operably coupled to an active antenna array 330, of whose receiver elements are arranged to individually provide down-converted digitised samples corresponding to the receive channel in question for the received signals. As will be appreciated by a skilled artisan, the transmit section is also operably connected to the antenna array 330.

The OBSAI RP3 01/CPRI interface 304, as decoded from the Node B baseband, outputs IQ sample pairs and the digital signal processing chain for the active antenna performs filter functions 306 and application of beam-form weights 308 for each of the individual transceiver elements. In accordance with embodiments of the invention, beam-form weights 308 may comprise of relative phase, amplitude and latency relationship to each of the antenna elements. Calibration correction resultant coefficients (in order to eliminate calibration measurement errors) are applied to the composite beam-form error correction process. One example for eliminating feedback errors is detailed in the flowcharts of FIG. 7 and FIG. 8. Advantageously, the calibration correction resultant coefficients may also be added to correct for any impairments in the individual transmit chain. Multiple antenna Array TX signal processing functions are performed in parallel, with the test calibration method only arranged to use one antenna array at a time.

Each of the plurality of parallel transceiver circuits 312 comprise digital to analogue conversion, 314, to generate complex baseband analogue signals. The analogue signals are filtered, 316, and frequency translated, 318, 320, to the desired RF band. These RF signals are amplified, 322, and routed through a duplexer device, 324, in order to isolate transmit signals from the receive paths. Once amplified, the RF signals are routed to the antenna elements 330 via a coupler structure 326, for example as described in FIG. 4.

For receive functionality using the antenna array 330, each antenna element has its own receive signal chain. The plurality of parallel transceiver circuits 312 comprise, in a receive mode, an antenna duplexer 324 providing a received signal to a low-noise amplifier (LNA) 332. The LNA 332 provides amplified versions of the received signals to respective quadrature ('I' and 'Q') down-conversion stages 334 arranged to down-convert the respective amplified received signals based to a frequency down-conversion signal. Down conversion signals are fed in quadrature format from a local oscillator generation sub-system 340. The respective quadrature down-converted amplified received signals are input to respective low-pass filters 336 and thereafter to respective analogue-to-digital converters 338 to transform the quadrature down-converted received signal to a digital form.

In accordance with embodiments of the invention, the digital form of the various received signals of a single polarisation type, e.g. −45 degree is input to a plurality of parallel beam-form processing logic modules 344.

Notably, in accordance with embodiments of the invention, beam-forming processing involves application of phase, amplitude and latency scaling of each individual receive signal that corresponds to a beam pattern co-efficient 342.

Each of the plurality of parallel beam-form processing logic modules 344 comprise respective logic arranged to process beam-forming and subsequent channel filtering. The parallel beam-form processing logic modules 344 process the received digital form of the signals using respective channel filters and provide output signals. Each of the digital output signals in 'I' and 'Q' format will be additively combined 346. Thus, in the digital domain filtering, beamform weighting and calibration correction is performed on each receive path. These are output through the OBSAI RP3 01/CPRI interface 302 to the Node B baseband.

Likewise, for receive diversity processing, each of a plurality of parallel receiver circuits 374 comprise, in a receive mode, a receive band-pass filter 376 providing a received signal to a low-noise amplifier (LNA), 378. The LNA 378 provides amplified versions of the received signals to respective quadrature ('I' and 'Q') down-conversion stages 382 arranged to down-convert the respective amplified received signals to a frequency down-converted signal. Down converted signals are fed in quadrature format from a local oscillator generation sub-system, 380. The respective quadrature down-converted amplified received signals are input to respective low-pass filters 384 and thereafter to respective analogue-to-digital converters 386 to transform the quadrature down-converted received signal to a digital form.

In accordance with embodiments of the invention, the digital form of the various received signals of a single polarisation type, e.g. −45 degree is input to a plurality of parallel beam-form processing logic modules 392.

Notably, in accordance with embodiments of the invention, beam-forming processing involves application of phase, amplitude and latency scaling of each individual receive signal that corresponds to a beam pattern co-efficient 390.

Each of the plurality of parallel beam-form processing logic modules 392 comprise respective logic arranged to process beam-forming and subsequent channel filtering. The parallel beam-form processing logic modules 392 process the received digital form of the signals using respective channel filters and provide output signals. Each of the digital output signals in 'I' and 'Q' format will be additively combined 394.

The output of the beam-forming process results in digital signal type corresponding to signals received substantially within the processed beam formation. These digital signals are converted to analogue format and up-converted to produce a signal in the frequency band that can be further processed by the Node-B.

It is envisaged that power management functions and clock generation functions may be used, but are not shown in the diagrams for the sake of simplicity.

In accordance with one embodiment of the invention, diversity receive paths may be re-transmitted to the Node-B, which in one embodiment is a legacy Node-B. In one example embodiment, the antenna array system may comprise of one or more cross-polarised antenna elements. In this manner, antenna elements of one polarisation type may be processed by the Node-B through a separate diversity receiver, with the diversity signal relayed back to the Node-B on a separate re-transmission path.

In one example embodiment, it is envisaged that system-wide enhancements may be achieved. For example, embodiments of the invention may 'locally' monitor information relating to the cell environment, and this information may be passed to the system's existing OMC independent from other OMC traffic, in order for the OMC to effect system-wide changes. Furthermore, for example, signals may be received from each of the antenna elements of the antenna array, where each signal is regenerated into a single antenna feed. In this example, the regenerated signal information may be processed in such a way that some of the network environmental information may be lost. In conventional antenna arrays no spatial environmental information can be derived, thus processing this information yields benefits over conventional systems.

Incoming RF signals that are incident on the antenna array may have an Angle of Arrival (AoA) calculated. These may be determined by the controller logic in conjunction with the active beam-former logic modules. Thus, information from a wide-angle beam may be relayed back to the Node-B or OMC.

However, in order to assist network optimisation, it is known that there may be statistically more signals coming from a narrower angle of arrival on an antenna array. This information may be statistically processed from the signal received on the individual antenna elements. In this example, it is envisaged that this information may be relayed back to the OMC using, for example IP messages via the network element/modem. In response to these IP messages, the OMC may be able to adjust network parameters, such as beam direction and beam-form Azimuth pattern type. Alternatively, or additionally, the OMC may use such information to change uplink or down link pattern types, for example to better optimise or plan the network. OMC instructions can be relayed using such an IP modem.

In accordance with embodiments of the invention, calibration of the antenna array and application of correction coefficients are controlled by calibration controller logic 352, which is further described with reference to FIG. 5 and FIG. 6. The calibration controller logic 352 is, thus, operably coupled to the parallel beam-form processing logic modules 310, 344, 392.

In accordance with embodiments of the invention, the calibration controller logic 352 also controls the routing of RF and test signals within the coupler structure 326, as further described with reference to FIG. 4. In this regard, the calibration controller logic 352 is arranged to output calibration signal and receive signals from the feedback transceiver circuits 312 via calibration signal generation and feedback transceiver circuitry 363.

The calibration signal generation and feedback transceiver circuitry 363 comprises a plurality of digital input/output ports coupled to the calibration controller logic 352 and arranged to provide or receive digitized IQ signals. The calibration signal generation and feedback transceiver circuitry 363 comprises digital to analogue conversion, 354, to generate complex baseband analogue signals. The analogue signals are filtered, 356, and frequency translated, 360, to the desired RF band. The calibration signal generation and feedback transceiver circuitry 363 also comprises respective quadrature ('I' and 'Q') down-conversion stages 366 arranged to down-convert the respective amplified received signals to a frequency down-converted signal. Down converted signals are fed in quadrature format from a local oscillator generation sub-system, 368. The respective quadrature down-converted amplified received signals are input to respective low-pass filters 370 and thereafter to respective analogue-to-digital converters 372 to transform the quadrature down-converted received signal to a digital form.

The calibration signal generation and feedback transceiver circuitry 363 comprises a double pole double throw switch 362 arranged to route a single feedback or calibration signal to the coupler structure 326 via a switchplexer 364. The function of the calibration signal generation and feedback transceiver circuitry 363 is to connect the feedback point to the respective coupler path under calibration measurement. For receive calibration the calibration signal generation and feedback transceiver circuitry 363 is arranged to up-convert the calibration signal to the frequency of operation of the receiver under measurement. For transmit operation, the calibration signal generation and feedback transceiver circuitry 363 is arranged to down-convert to baseband the RF signal under test of the transmitter. Advantageously, much of the feedback or signal generation is common, thereby minimising impact to measurement results in conjunction with the normalising algorithm.

In embodiments of the invention, different types of digital test-tone may be utilised. For example, it is envisaged that the digital test tone may be real, complex (for example either Cartesian-based or of polar mode). Furthermore, it is envisaged that the digital test-tone may be a broad-spectrum test-tone or a narrow-spectrum test-tone or that some of the test-tone characteristics, such as power, frequency response, etc. may even change mid-calibration.

Furthermore, the inventors have determined that convergence of the receive calibration algorithm may be heavily dependent on the calibration digital test-tone signal used. If an inappropriate digital test-tone is used, the solution may converge to (what is generally referred to in convergence theory, as) a 'local minimum'. Basically, this means that the solution calculated by the adaptive algorithm is sub-optimal and would be detrimental to the functionality of the overall calibration system.

Thus, selecting the correct digital test-tone becomes a trade-off between speed of convergence, accuracy of convergence, robustness to SNR and proximity of local minima. To ensure that the algorithm converges to a substantially optimal solution, embodiments of the invention, propose logic to provide gearing of the digital test-tone.

In one embodiment of the invention, the calibration algorithm commences with two digital test-tones of relatively low frequencies. The use of such digital test-tones helps to eliminate local minima and causes the algorithm to converge a majority of the way to the optimal solution. Once the algorithm has converged to close to the substantially optimal solution, one embodiment of the invention proposed to switch to higher frequency digital test-tones where convergence is then achieved in a smoother fashion to the nearest solution (which of course is now the optimal solution due to the initial part of the algorithm).

Figure 4:
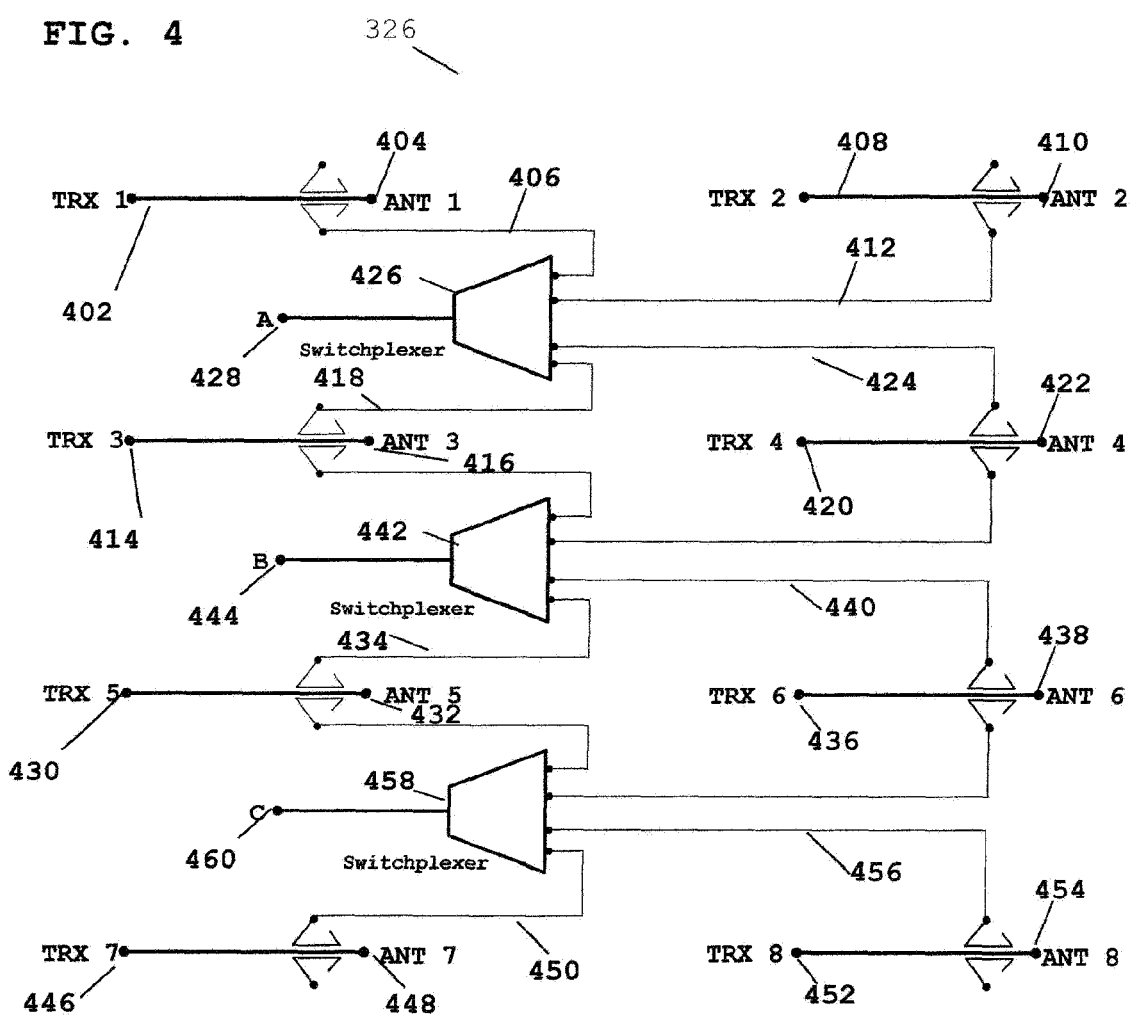
FIG. 4 illustrates a more detailed example of a switched coupler structure utilized in calibrating beam-form antenna array in accordance with the network element example embodiment of FIG. 3.

Referring now to FIG. 4, a more detailed example of a switched coupler structure 326 utilized in calibrating a beamform antenna array is illustrated in accordance with the network element example embodiment of FIG. 3. In particular, the switched coupler structure 326 allows for a common receive or transmit array mismatch correction arrangement. This is in contrast to separate transmit and receive beamforming array calibration structures and associated calibration schemes that are described in the known art.

The example coupler structure of FIG. 4 is an eight antenna coupler matrix and may be utilised to allow calibration of the same receiver and transmitter by using two different coupler paths. This allows normalisation of the different paths when calculating the calibration result coefficients.

Eight transceivers 402, 408, 414, 420, 430, 436, 446, 452 are individually operably coupled to a respective antenna 404, 410, 416, 422, 432, 438, 448, 454. Each transceiver 402, 408, 414, 420, 430, 436, 446, 452 and respective antenna 404, 410, 416, 422, 432, 438, 448, 454 is arranged to be operably coupled to two out of three switchplexers 426, 442, 458, in this example, which are arranged such that test signals may be routed to each transceiver via alternative test paths.

The switched coupler structure 326 of FIG. 4 comprises three switchplexers 426, 442, 458 each comprise four inputs and one output, namely switchplexer port A 428, switchplexer port B 444 and switchplexer port C 460.

The operation of the switched coupler structure 326 of FIG. 4 may be better understood when considering the following example signal flows.

For example, a signal on Ant3 416 can be coupled back/through on switchplexer port A 428 and different switchplexer port B 444. Let us consider a case of a transmitter calibration using a signal on Ant3 416. If the signal coupled back measured differently between the different feedbacks, e.g. via switchplexer port A 428 and different switchplexer port B 444, then it may be assumed that the error may be attributed as a feedback path mismatch. This feedback mismatch may then be negated from the corresponding phase/amplitude/latency correction of all signal paths using switchplexer output B 444, thus substantially minimising the feedback error.

Conversely for receive calibration, a signal may first be input to switchplexer port A 428, then switchplexer port B 444, and corresponding receive measurements will allow negation of mismatch on the feed-forward calibration signal paths.

The proposed coupler matrix is able to scale below and beyond a use of eight antennae, and is not restrictive to an array size. Of note in the coupler matrix structure 326 is that at least two directional couplers are located between each transceiver and the respective antenna path. With an eight antenna coupler matrix, a phase mismatch correction of better than 5 deg. may be achieved accounting for accumulated error because of array size. Antennae of common polarisation are combined together before Node B baseband processing, and can, thus, be calibrated separately to those of an alternate polarisation.

In a receive calibration mode of operation, only one receive signal processing path is measured as part of the calibration process at any particular time, thereby having minimal impact on the overall receiver performance. Furthermore, when one antenna path is being measured, the antenna coupler structure 326 ensures that the receive test signal will not substantially couple to other antenna paths. In this regard, sufficient switchplexer port isolation exists and sufficient directivity of the switched couplers exists. Furthermore, the isolation between adjacent antenna structures ensures that the calibration tone isolation is limited to a single path, thereby not significantly impairing non-measured receive signal processing paths.

In one embodiment of the invention, the frequency of running the calibration routines is made dependent upon the prevailing network air-interface traffic and environmental conditions. For example, in one embodiment, calibration may be performed more regularly during fast changing environmental conditions, or less regularly during busy traffic times.

Assuming equal weighting of all elements then the impact on SNR for the duration of the calibration is $$RxSNRcal = 10 \log(1 - (1/(MN)))$$ [Eqn. 3]

Where:
M is the amount of array rows and
N is the array columns.
For a 16 element array this would equate to just 0.28 dB degradation.

In one embodiment of the invention, each of the transceiver paths may be measured and where applicable the same transceiver path may be measured more than once, for example in a receive mode of operation by using a different test signal path. In this manner, the test path error may be normalised based on a single receiver being measured using two test different test signals being applied to two transceiver paths. Thereafter, all other tested receivers using a single path may be normalised to the receiver using the alternate path. The difference in test results for the different transceiver paths may be used to estimate any offsets due to the feedback path. Such offsets may be used to normalise the results, such that mismatch variation in feedback errors may be eliminated as an error source on the resultant calibration signal.

In one embodiment, latency compensation may be determined by referencing and normalising all latency estimates on these measurements to the longest determined path delay. Thereafter, a compensating latency can be made on each of the other receive paths accordingly, to ensure consistency amongst the receive paths.

Furthermore, in one embodiment of the invention, receive paths that are determined as having significantly reduced signal quality or magnitude, when compared to an expected signal quality or magnitude, may be eliminated from the array as the respective noise contribution may only degrade the overall performance. In this manner, this embodiment may allow an antenna soft-fail mechanism to be employed in a communication system employing an antenna array. Thereafter, a status update may be set, for example to initiate either maintenance or network OMC compensation.

Figure 5:
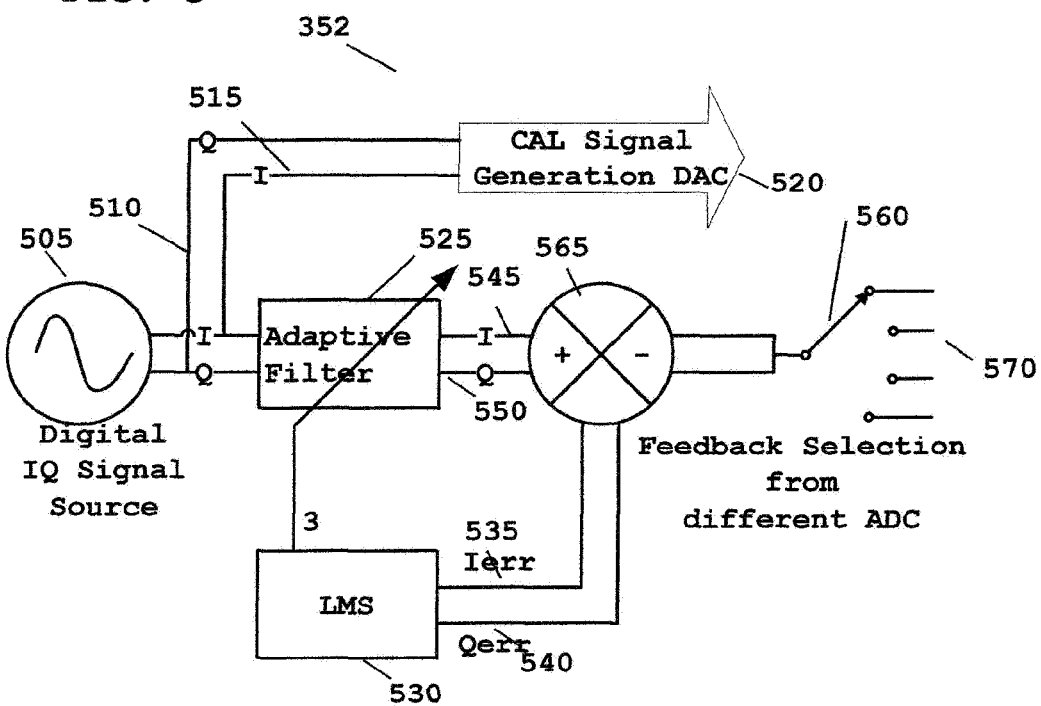
FIG. 5 illustrates an example of a calibration controller of the network element arranged to calibrate the beam-forming antenna array in accordance with some embodiments of the invention.

Referring now to FIG. 5, an example of a calibration controller 352 of the network element 300 of FIG. 3 is illustrated, in accordance with some embodiments of the invention. The calibration controller 352 comprises a digital IQ signal source 505 that is arranged to provide complex digital IQ signals 510, 515 to be used as a calibration signal 520 to digital-to-analogue converter (DAC) inputs on a calibration signal generation and feedback transceiver circuitry 363, which is coupled to the receive path under measurement. The same digital IQ signals 510, 515 are provided to an adaptive mechanism 525. The adaptive filter 525 provides modified digital IQ signals 545, 550 to comparator logic 565. The comparator logic 565 also receives IQ digital signals selected, by selector logic 560. The selector logic 560 selects a particular feedback IQ digital signal of the receive path under test, from a variety of different analogue-to-digital converter (ADC) signals 570. In this manner, the comparator logic 565 compares the two pairs of digital IQ signals and produces digital IQ error signals 535, 540 that are input to an adaptive filter update algorithmic function/logic, such as a least means square (LMS) type structure 530. The least means square (LMS) type structure 530 then provides two adjustment signals to the adaptive filter 525.

When the adaptive filter 525 has converged, a measurement is taken from each transceiver with the resultant values output from the LMS logic 530 being stored. Convergence is defined as a state to where the error signals 535, 540 are sufficiently minimised. When the process has completed a full set of measurements, a process of calculating composite beam-form and calibration update coefficients is undertaken for the signal processing path. A composite beam-forming and resultant calibration correction function are not described in the known art.

Figure 6:
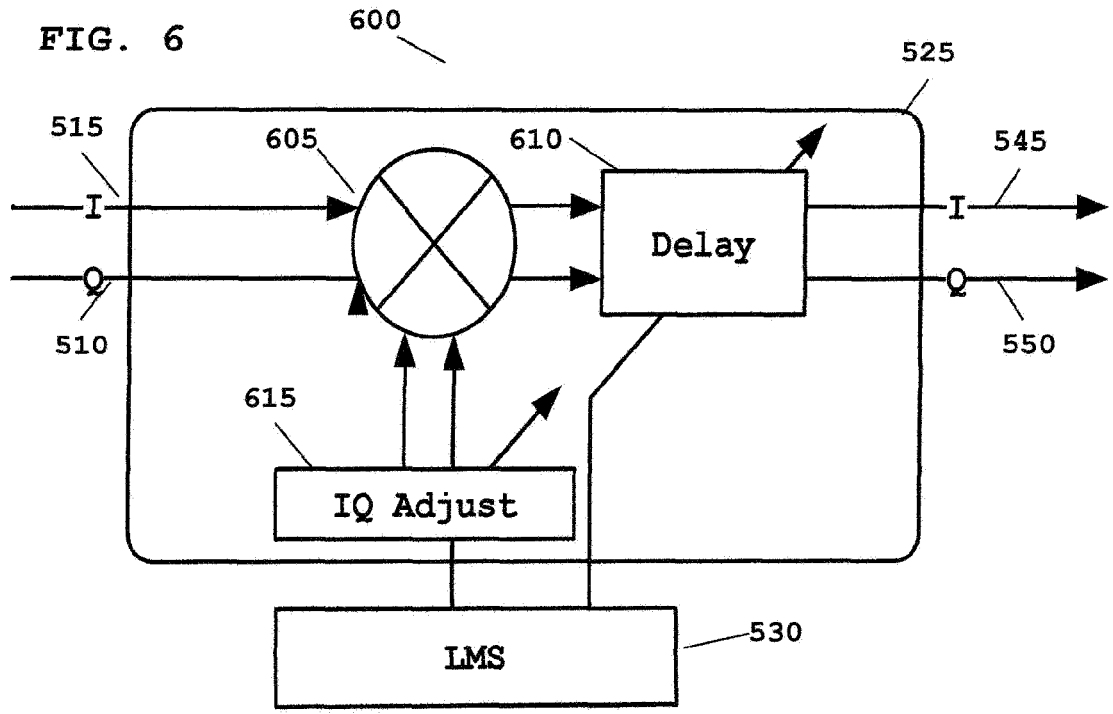
FIG. 6 illustrates a more detailed example of an adaptive filter that may be employed in the calibration controller of FIG. 5.

Referring now to FIG. 6, a more detailed example of an adaptive filter 525 that may be employed in the calibration controller of FIG. 5, is illustrated. The adaptive filter 525 receives digital IQ signals 510, 515 that are also used as a calibration signal. The adaptive filter 525 comprises complex multiplier logic 605 arranged to multiply the digital IQ signals 510, 515 with digital IQ signals provided by IQ adjustment logic 615. In this manner, the IQ adjustment logic 615 together with the complex multiplier logic 605 adjusts the phase and/or gain of the digital IQ signals 510, 515. The operation of the IQ adjustment logic 615 is controlled by an adjustment signal generated by the LMS type structure 530.

In accordance with embodiments of the invention, the phase and/or gain adjusted digital IQ signals are input to delay logic 610. In this manner, the delay logic 610 adjusts the latency of the phase and/or gain adjusted digital IQ signals. The operation of the delay logic 610 is controlled by an adjustment signal generated by the LMS type structure 530. The delay logic 610 of the adaptive filter 525 outputs phase and/or gain and/or latency adjusted digital IQ signals 545, 550.

The receive calibration algorithm initially uses the input signal level from the ADCs, in order to take a measurement of the RF environment. Depending on the type of adaptive algorithm employed, the test signal is set to be within the dynamic range of the receiver's ADC under test, and thus of a sufficiently high level to ensure that the received CINR for the respective calibration signal is capable of converging with the reference test signal. In this embodiment, a low-pass filter 392 may be placed in an ADC feedback path, such that it selectively eliminates the rest of the ambient RF signal.

A minimal level for the RF test signal is maintained, to ensure that the isolation of the test signal at one coupler to the other receiver paths is minimised. Thus, if the RF test signal is sufficiently stronger than the RF ambient live network traffic, the performance of the calibration routine would substantially impair live network traffic reception, due to leakage of the calibration signal to other receive paths.

In accordance with embodiments of the invention a receive array calibration scheme is proposed where the response of individual receivers in terms of latency, phase response and gain may be measured. A normalising gain, phase and latency adjustment can then be made to the combined receiver signals, such that the wanted signals may be optimally combined to provide the desired beam pattern. Advantageously, the beam-forming weighting, plus the corrective mismatch phase and amplitude scaling may be combined into one adjust stage.

Receiver calibration is performed by generating a test signal that is applied to one receiver element at a time through a switched coupler network. In one embodiment, the test tone amplitude may be set to be 10 dB above the RF ambient live network traffic signal or noise floor level of the receiver, to ensure that it is measurable following attenuation by the respective passive components and coupling mechanisms used in the switched coupler structure 326 of FIG. 4.

Any impairments between the respective receive paths, as determined using the test tone, may be adjusted for during calibration. The feedback path through the switchplexer to the calibration receiver and the path used to route the test tone for receive calibration through the switchplexer will experience different path delays, phase response and insertion losses.

In one embodiment of the invention, a reference test signal may be selected so that all other receive path complex differential mismatch variables can be derived. In receive calibration, poorly chosen test signals may cause the adaptive algorithms to converge to a solution that is significantly removed from the true optimal solution. Hence, test-tones must be carefully crafted to ensure that they are able to converge correctly. Once the complex differential mismatch variables have been derived, they may be combined in a product fashion with the beam-form weights to achieve a desired beam-form pattern.

In accordance with embodiments of the invention a receive array calibration scheme is proposed that can be performed in such a way as it does not substantially impair live network performance.

In one embodiment of the invention, it is envisaged that the receive calibration process or transmit calibration process may be implemented as a function of one or more of the following:

(i) An accuracy required of the beam,
(ii) How often the receive or transmit line-ups are to be reconfigured, and
(iii) A rate of change of environmental factors.

However, for a fixed beam pattern based on environmental factors that change the individual receiver or transmitter response, it is expected that the time frame between successive receive or transmit calibration processes may be of the order of a few minutes.

Referring now to FIG. 7 there is illustrated an example of a flowchart 700 for performing receive calibration of an antenna array. The flowchart 700 commences with initialising calibration hardware, for example comprising of loading initial estimates of the amplitude, phase and latency, adaptive algorithm, specific convergence parameters (i.e. LMS gain), specific timers for calibration durations and coupler network configuration, as shown in step 705. Once the calibration hardware has been initialised in step 705, optimal test signal amplitude settings are set in order to factor any ambient RF environment effect on the antenna element, as shown in step 710. A test signal is then applied to a single receive path and is input to a desired analogue-to-digital converter (ADC) as shown in step 715. A receive calibration routine is then run and the process waits for a converged result. Once the result has converged, the converged adaptive filter values, for example for amplitude, phase and latency, are extracted as shown in step 720. The latency measurement may then be adjusted to incorporate any latency adjustment that already exists in the loop, for example as determined from previous calibrations.

A determination is then made as to whether the calibration routine was performed on the last receive measurement, as shown in step 725. If the determination is that it was not the last receive measurement, in step 725, the flowchart loops back to step 715.

If the determination is that it was the last receive measurement, in step 715, the process then normalizes all errors using common receiver calibration results from different signal paths, as shown in step 730. Thereafter, the process identifies those receive paths whose detected signal was determined as being below a signal threshold level in order to identify any failed paths, as shown in step 735. For those receive paths that have been identified as having a detected signal being below the signal threshold, in step 735, the particular receive path is eliminated from the receive calibration process and, in one embodiment of the invention, a soft fail flag is set, as shown in step 740.

For those receive paths that have been identified as not being below the signal threshold, in step 735, a determination of the longest latency value is made, in step 745. Once the longest latency value is identified in step 745, all latency values on the receive signals are normalised to the longest latency value, as shown in step 750. Once all of the determined latency values are normalised to the longest latency value in step 750, complex scaling of a result from a reference transmit path is performed in order to determine normalising result to be applied to all other receive paths, as shown in step 755. Thereafter, the normalising complex result is scaled with a determined desired beam weighting for each path, as shown in step 760. Finally, the composite updated coefficients are applied to all receive paths in the antenna array, as shown in step 765.

In accordance with a further embodiment of the invention, for transmit calibration, it is envisaged that a similar structure to that used in receive calibration may be used. However, instead of a digital IQ source, embodiments of the invention may utilise live network traffic signals. In this embodiment, the transmit signal is known as it is the IQ data stream from the digital baseband circuitry on the Node B.

Referring now to FIG. 8 there is illustrated an example of a flowchart 800 for performing transmit calibration of an antenna array. The flowchart 800 commences with initialising calibration hardware, for example comprising of loading initial estimates of the amplitude, phase and latency, adaptive algorithm, specific convergence parameters (i.e. LMS gain), specific timers for calibration durations and coupler network configuration, as shown in step 805. Once the calibration hardware has been initialised in step 805, optimal calibration feedback line-up settings are set in order to factor the power on the antenna element, as shown in step 810. Thereafter, appropriate live transmit signals are coupled through a calibration feedback path, as shown in step 815.

A transmit calibration routine is then run and the process waits for a converged result. Once the result has converged, the converged adaptive filter values, for example for amplitude, phase and latency, are extracted as shown in step 820. The latency measurement may then be adjusted to incorporate any latency adjustment that already exists in the loop, for example as determined from previous calibrations, as shown in step 825. Furthermore, for example, the amplitude and phase measurements may also be adjusted to incorporate the amplitude and phase adjustments that have already been added in the loop, for example from previous calibrations, as shown in step 830.

Once any adjustments have been made to one or more of the amplitude phase and latency values, the amplitude phase and latency are stored in software, as shown in step 835. A determination is then made, in step 840, as to whether the calibration routine was performed on the last transmit measurement, as shown in step 840. If the determination is that it was not the last transmit measurement, in step 840, the flowchart loops back to step 815.

If the determination is that it was the last transmit measurement, in step 840, the process then identifies those transmit paths whose detected signal was determined as being below a threshold value, or any calibrations that did not manage to converge, as shown in step 845. For those transmit paths that have been identified as having a detected signal being below the threshold value, or where any calibrations did not manage to converge, in step 845, the particular transmit path is eliminated from the transmit calibration process and, in one embodiment of the invention, a soft fail flag is set, as shown in step 850.

For those transmit paths that have been identified as not having a detected signal being below the threshold value, or where any calibrations did not manage to converge, in step 845, all of the determined latency values are normalised to the longest latency value, as shown in step 855. Once all of the determined latency values are normalised to the longest latency value in step 855, complex scaling of a result From a reference transmit path is performed in order to determine normalising result to be applied to all other transmit paths, as shown in step 860. Thereafter, the normalising complex result is scaled with a determined desired beam weighting for each path, as shown in step 865. Finally, the composite updated coefficients are applied to all transmit paths in the antenna array, as shown in step 870.

Figure 9:
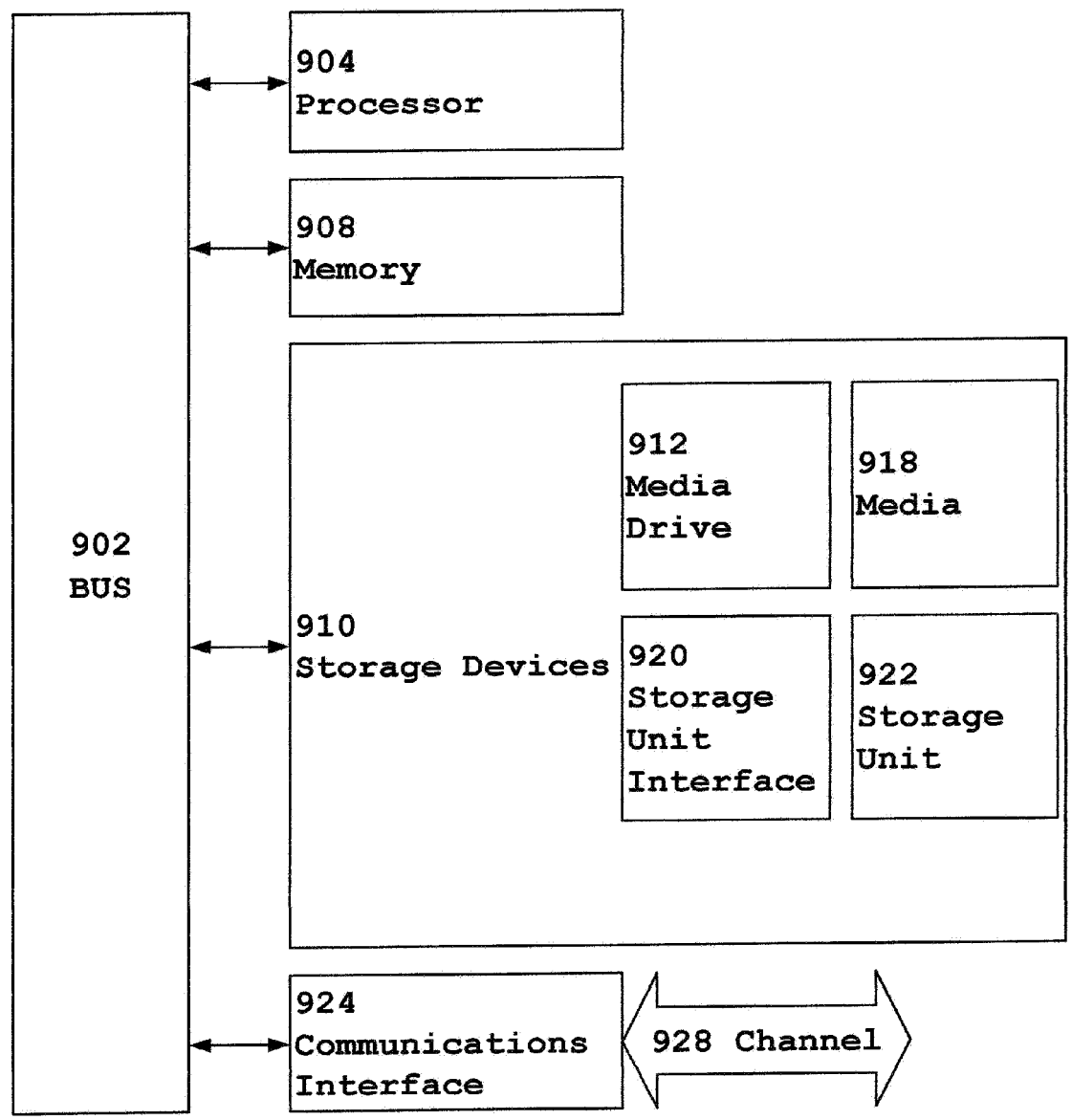
FIG. 9 illustrates a typical computing system that may be employed to implement signal processing functionality in embodiments of the invention.

Referring now to FIG. 9, there is illustrated a typical computing system 900 that may be employed to implement signal processing functionality in embodiments of the invention. Computing systems of this type may be used in access points and wireless communication units. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special-purpose processing engine such as, for example, a microprocessor, microcontroller or other control logic. In this example, processor 904 is connected to a bus 902 or other communications medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory (ROM) or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having particular computer software or data stored therein.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a universal serial bus (USB) port), a PCMCIA slot and card, etc. Software and data transferred via communications interface 924 are in the form of signals which can be electronic, electromagnetic, and optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 908, storage device 918, or storage unit 922. These and other forms of computer-readable media may store one or more instructions for use by processor 904, to cause the processor to perform specified operations. Such instructions, generally referred to as 'computer program code' (which may be grouped in the form of computer programs or other groupings), when executed, enable the computing system 900 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 922, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

It is envisaged that the aforementioned inventive concept aims to provide one or more of the following advantages:

(i) WO2008000318(A1) proposes a coupler scheme that necessitates that multiple receiver chains need to be disabled in order to perform the calibrations. This requirement is an artefact of the common coupler structure to multiple antenna paths. Embodiments of the invention herein described comprise a switched coupler structure that is adapted to overcome this deficiency.

(ii) A transmit calibration mechanism is described that may utilise the proposed switched coupler structure to facilitate feedback of live transmission, which does not impair the live transmission, and therefore does not degrade network performance.

(iii) In the mechanism proposed in U.S. Pat. No. 6,339,399 B1, only amplitude and phase correction on the respective receive paths is taken into consideration, due to the use of a complex multiplier. However, such a technique does not take into account a significant factor in future wideband use of antenna arrays, namely latency. Embodiments of the invention herein described proposed a novel scheme that also corrects latency matching of paths. A calibration controller is described that is arranged to detect mismatch of gain, phase and latency in parallel processing receive paths.

(iv) U.S. Pat. No. 6,339,399 B1 proposed a mechanism that uses distinct beam-forming component blocks to that for receive calibration resultant correction. In contrast, embodiments herein described propose a mechanism whereby a common active beam-former and correction scheme may be employed.

(v) A composite beam-forming calibration and correction logic is also described that uses a composite signal to effect beam steering and mismatch alignment processing.

(vi) A receive calibration method is also proposed whereby one receive chain at a time is measured, using a test signal, thereby negating any effect of on-going receive traffic.

Receive calibration feedback errors may also be normalised with a plurality of matched couplers per path utilising unique feedback paths.

(vii) An algorithm for sequencing through an antenna array measurements and a detection scheme for failed antenna line-up is also described.

(viii) A method for determining composite weighting on respective receive paths for beam-forming is also described.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

The invention claimed is:

1. A method for calibrating an antenna array comprising a plurality of antenna elements coupled to a plurality of respective receive paths in a wireless communication system, the method comprising in receive mode the steps of:
   providing first digital IQ signals;
   translating the first digital IQ signals to a radio frequency to generate a receive test signal;
   applying the receive test signal to a switched coupler array network so that the receive test signal is substantially coupled only to an individual single receive path of the plurality of receive paths to transform the received test signal to a feedback digital IQ signal;
   selecting the feedback digital IQ signal;
   running a receive calibration measurement routine using the first digital IQ signals on at least one processor configured to determine at least one measurement value of at least amplitude, phase or latency and waiting for at least one converged measurement value, wherein the calibration measurement comprises a comparison of an adapted digital IQ signal and the selected feedback digital IQ signal on an output of the individual single receive path to determine said at least one converged measurement value;
   extracting the converged measurement value for at least one individual receive path;
   repeating steps of applying, selecting running, and extracting for a next individual single receive path until the calibration routine has completed;
   selecting a converged measurement value of at least one individual receive path from a plurality of receive paths to form a reference receiver calibration result;
   normalizing a plurality of at least one measurement values of the plurality of receive paths using the reference receiver calibration result;
   selecting one of the plurality of normalized measurement values based on prescribed criteria; and
   applying a selected normalized value to at least one of the plurality of receive paths.

2. A method for calibrating an antenna array of claim 1 further comprising setting an optimal test signal amplitude level by factoring an ambient radio frequency environment effect on an associated antenna element of the single individual receive path.

3. A method for calibrating an antenna array of claim 1 further comprising identifying those single individual receive paths whose converged measurement result is determined as being below a signal threshold level.

4. A method for calibrating an antenna array of claim 3 further comprising eliminating from the receive calibration process the single individual receive path identified as being below a signal threshold level.

5. A method for calibrating an antenna array comprising a plurality of antenna elements coupled to a plurality of respective transmit paths in a wireless communication system, the method comprising in transmit mode the steps of:
   routing live transmit network signals through at least one transmit path;
   feeding back a portion of the live transmit signals pertaining to a selected path under calibration measurement via a switched coupler network thereby transforming the transmit live network signal to a feedback digital IQ signal;
   running a transmit calibration measurement routine on at least one processor configured to determine at least one measurement value used to calibrate the individual single transmit path and waiting for at least one converged measurement value of at least one from a group consisting of: amplitude, phase or latency; wherein the calibration measurement comprises a comparison of an adapted IQ data stream pertaining to the live network transmit signals and the feedback digital IQ signal to determine said at least one converged measurement value;
   extracting the converged measurement value of at least one individual single transmit path;
   repeating steps of applying, running, and extracting for a next individual single transmit path until the calibration routine has completed;
   selecting a converged measurement value of at least one individual single transmit path from a plurality of transmit paths to form a reference transmitter calibration measurement result;
   normalizing a plurality of at least one measurement values of a plurality of transmit paths using the reference transmitter calibration measurement result;
   selecting one of the plurality of normalized measurement values based on prescribed criteria; and
   applying a selected normalized measurement value to at least one of the plurality of transmit paths.

6. A method for calibrating an antenna array of claim 5 further comprising identifying for at least one of the single individual transmit paths at least one from a group consisting of:
   whether the converged at least one measurement result value is below a threshold level;
   whether the calibration did not converge.

7. The method for calibrating an antenna array of claim 6 further comprising identifying the single individual transmit path as a failed transmit path upon identifying that:
  the converged at least one measurement result is determined as being below threshold level, or
  the calibration did not converge.

8. A method for calibrating an antenna array of claim 5 further comprising eliminating from the transmit calibration process those transmit paths that have been identified as failed.

9. A method for calibrating an antenna array of claim 5 further comprising setting optimal calibration feedback line-up settings to factor a power level of the single individual transmit path.

10. A method for calibrating an antenna array of claim 1 wherein the at least one measurement value of the plurality of receive paths is a latency value, the method further comprising determining a longest latency value for those receive paths that have been identified as being
  a receive converged at least one measurement value that is not below a signal threshold.

11. A method for calibrating an antenna array of claim 10 further comprising normalising each latency value for each single individual receive signal to the longest latency value.

12. A method for calibrating an antenna array of claim 1 further comprising scaling the normalised at least one measurement value to at least one composite beam weighting coefficient for each receive path of the plurality of receive paths; and
  applying the at least one composite beam weighting coefficient to at least one receive path.

13. A method for calibrating an antenna array of claim 1 further comprising initialising calibration hardware.

14. A method for calibrating an antenna array of claim 1 further comprising adjusting at least one measurement value of: latency, phase or amplitude measurement to incorporate any latency phase or amplitude adjustment that exists in a plurality of receive paths, where the latency phase or amplitude adjustment is determined from a previous calibration iteration.

15. A method for calibrating an antenna array of claim 1 further comprising using a common antenna array element and corresponding common switched coupler paths in a receive mode.

16. A method for calibrating an antenna array of claim 1 wherein determining that the calibration measurement routine has completed comprises determining whether the calibration routine was performed on a last receive measurement.

17. A network element for calibrating an antenna array comprising a plurality of antenna elements coupled to a plurality of respective receive paths in a wireless communication system, wherein the network element comprises, in receive mode:
  a plurality of independent receiver circuits coupled to respective antenna elements of the antenna array;
  a circuit for translating first digital IQ signals to a radio frequency to generate a receive test signal and apply the received test signal to a switched coupler array network so that the receive test signal is substantially coupled only to an individual single receive path of the plurality of receive paths to transform the received test signal to a feedback digital IQ signal;
  a selector arranged to select the feedback digital IQ signal;
  at least one processor configured for executing the steps of:
    running a receive calibration measurement routine using the first digital IQ signals to determine at least one measurement value of at least amplitude, phase or latency and waiting for at least one converged measurement value, wherein the calibration measurement comprises a comparison of an adapted digital IQ signal and the selected feedback digital IQ signal on an output of the individual single receive path to determine said at least one converged measurement value;
    arranging to extract the converged at least one measurement value for the at least one individual receive path;
    repeating operations of applying, running, and extracting for a next individual single receive path until the calibration measurement routine has completed;
    selecting a converged measurement value of at least one individual receive path from a plurality of receive paths to form a reference receiver calibration result;
    normalizing a plurality of at least one measurement values of the plurality of receive paths using the reference receiver calibration result; and
    applying the at least one composite beam weighting coefficient to respective receive paths.

18. A network element for calibrating an antenna array comprising a plurality of antenna elements coupled to a plurality of respective transmit paths in a wireless communication system, wherein the network element comprises, in transmit mode:
  a plurality of independent transmit circuits coupled to respective antenna elements of the antenna array;
  a switched coupler network arranged to feed back a portion of the live transmit network signals pertaining to a selected path under calibration measurement thereby transforming the transmit live network signal to a feedback digital IQ signal;
  at least one processor configured for routing live transmit network signals through least one transmit path and executing the steps of;
    running a transmit calibration routine to determine at least one measurement value used to calibrate the individual single transmit path and waiting for at least one converged measurement value of at least one from a group consisting of: amplitude, phase or latency; wherein the calibration measurement comprises a comparison of an adapted IQ data stream pertaining to the live network transmit signals and the feedback digital IQ signal to determine said at least one converged measurement value;
    extracting the converged at least one measurement value of at least one individual single transmit path;
    repeating the steps of applying, running, extracting for a next individual single transmit path until the calibration routine has completed;
    selecting a converged measurement value of at least one individual single transmit path from a plurality of transmit paths to form a reference transmitter calibration measurement result;
    normalizing a plurality of at least one measurement values of a plurality of transmit paths using the reference transmitter calibration result;
    selecting one of the plurality of normalized measurement values based on prescribed criteria; and
    applying the normalized measurement value to at least one of the plurality of transmit paths.

\* \* \* \* \*